(12) United States Patent
Kanyo

(10) Patent No.: US 8,242,726 B2
(45) Date of Patent: Aug. 14, 2012

(54) METHOD AND CIRCUIT ARRANGEMENT FOR THE FEEDBACK OF COMMUTATION ENERGY IN THREE-PHASE CURRENT DRIVE SYSTEMS WITH A CURRENT INTERMEDIATE CIRCUIT CONVERTER

(75) Inventor: Pal Kanyo, Mühlethurnen (CH)

(73) Assignee: Econodrives GmbH (CH)

( * ) Notice: Subject to any disclaimer, the term of this patent is extended or adjusted under 35 U.S.C. 154(b) by 418 days.

(21) Appl. No.: 12/681,803

(22) PCT Filed: Oct. 6, 2006

(86) PCT No.: PCT/CH2006/000565
§ 371 (c)(1),
(2), (4) Date: Apr. 23, 2010

(87) PCT Pub. No.: WO2008/040131
PCT Pub. Date: Apr. 10, 2008

(65) Prior Publication Data
US 2010/0207561 A1     Aug. 19, 2010

(51) Int. Cl.
*H02P 6/14*     (2006.01)
(52) U.S. Cl. ............... 318/400.27; 318/400.08; 318/803
(58) Field of Classification Search ............ 318/400.27, 318/803, 400.08, 779, 723, 809, 798, 661, 318/721; 361/702; 363/137
See application file for complete search history.

(56) References Cited

U.S. PATENT DOCUMENTS 3,940,680 A * 2/1976 Tadokoro et al. ............ 104/289
5,574,636 A   11/1996 Lee et al. ...................... 363/132

FOREIGN PATENT DOCUMENTS

| JP | 55 127887 A | 10/1980 |
| JP | 57 059479 A | 4/1982 |
| WO | WO 96/08072 A | 3/1996 |

OTHER PUBLICATIONS

International Search Report dated Dec. 28, 2006, issued in corresponding international application No. PCT/CH2006/000565.
K.P. Philips "Current Source Converter for AC Motor Drives," IEEE Trans. Ind. Appl., vol. IA-8, pp. 679-683, Nov./Dec. 1972.

* cited by examiner

*Primary Examiner* — Karen Masih
(74) *Attorney, Agent, or Firm* — Ostrolenk Faber LLP

(57) ABSTRACT

There is disclosed a method and a circuit arrangement for the feedback of commutation energy in three-phase current drive systems with a current intermediate circuit converter. Commutation energy is released at each commutation in the inverter. The commutation unit ensures that the released energy is directly fed back to the current intermediate circuit in two steps. In the first step, the commutation energy is fed into the commutation capacitor by a rectifier circuit (diode bridge and three triacs). In the second step, the commutation energy is fed directly from the commutation capacitor into the current intermediate circuit by means of three semiconductors (first RIGBT, second RIGBT, diode) so that the current of the intermediate circuit flows through the capacitor over a controlled period of time.

11 Claims, 5 Drawing Sheets

US 8,242,726 B2

METHOD AND CIRCUIT ARRANGEMENT FOR THE FEEDBACK OF COMMUTATION ENERGY IN THREE-PHASE CURRENT DRIVE SYSTEMS WITH A CURRENT INTERMEDIATE CIRCUIT CONVERTER

CROSS REFERENCE TO RELATED APPLICATIONS

The present application is a 35 U.S.C. §371 National Phase conversion of PCT/CH2006/000565, filed Oct. 6, 2006, the disclosure of which is incorporated herein by reference. The PCT International Application was published in the German language.

FIELD OF THE INVENTION

The invention relates to a method and a circuit arrangement for the feedback of the commutation energy in three-phase motor drive systems with a current intermediate circuit converter.

BACKGROUND OF THE INVENTION

Today, in practical applications for current intermediate circuit converters, the so-called phase sequence inverter (K. P. Philips, "Current Source Converter for AC Motor Drives," IEEE Trans. Ind. Appl., Vol. IA-8, pp. 679-683, November/December 1972) is almost invariably used, FIG. 1.

In a phase sequence inverter, the commutation capacitors are adapted to the leakage inductance of the motor being used. It is therefore very problematic to use a phase sequence inverter for driving different motors having different leakage inductances.

SUMMARY OF THE INVENTION

It is an object of the present invention to eliminate this disadvantage by a cost-effective solution.

According to a first aspect of the invention the object is achieved by a method, wherein in a first step the created commutation energy is stored in a commutation capacitor. In a second step the commutation energy is directly fed from the commutation capacitor to the current intermediate circuit.

The commutation energy is temporarily stored, preferably in an intermediate circuit inductor, and in the following commutation in the inverter, this energy swings back into the commutation capacitor (reactive commutation power).

According to a second aspect of the invention the object is achieved by a circuit arrangement that comprises a commutation capacitor for storing the commutation energy created during an inverter commutation. For feeding the stored commutation energy into the current intermediate circuit the circuit arrangement further comprises two controllable semiconductors and a diode connected in series in the current intermediate circuit.

The invention is advantageously applicable in three-phase motor drive systems where energy feedback to the mains and/or a simple, sensorless positioning by means of synchronous motors is desired. Elevator technology is a typical field of application of such drive systems.

BRIEF DESCRIPTION OF THE DRAWINGS

The invention is explained by means of exemplary embodiments with reference to figures showing.

DETAILED DESCRIPTION OF THE PREFERRED EMBODIMENTS

Figure 1:
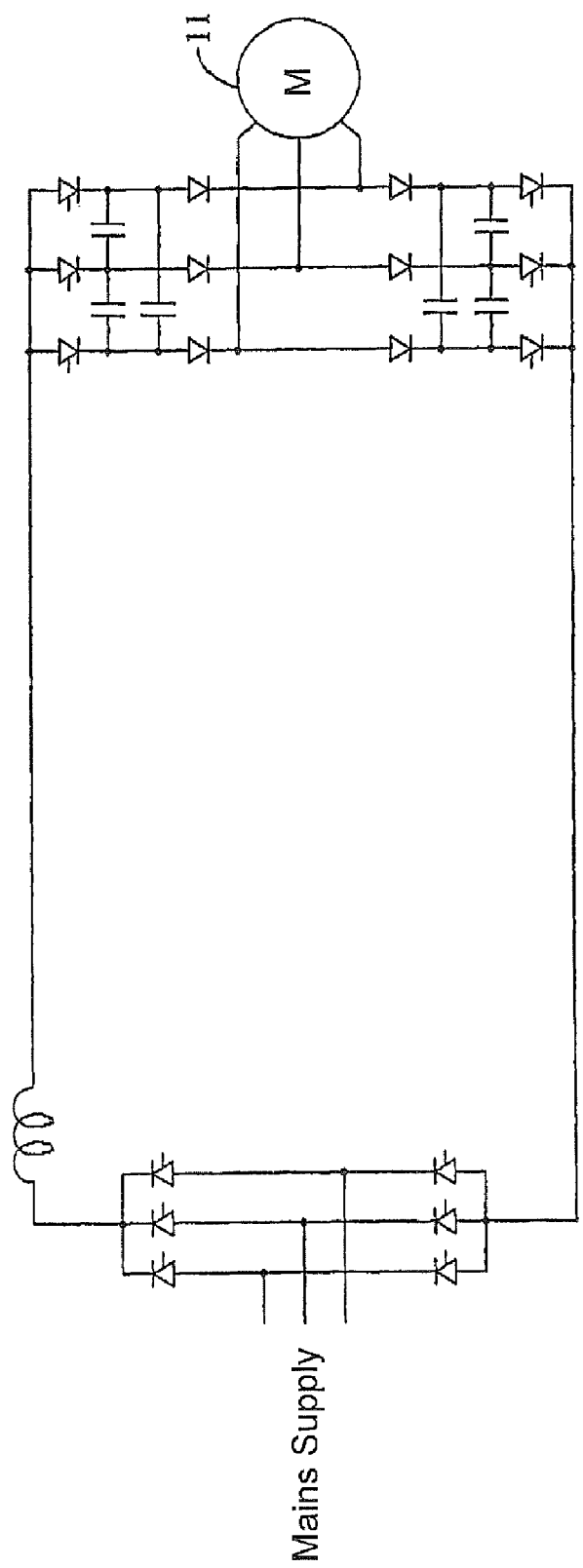
FIG. 1: The classical phase sequence inverter.
Figure 2:
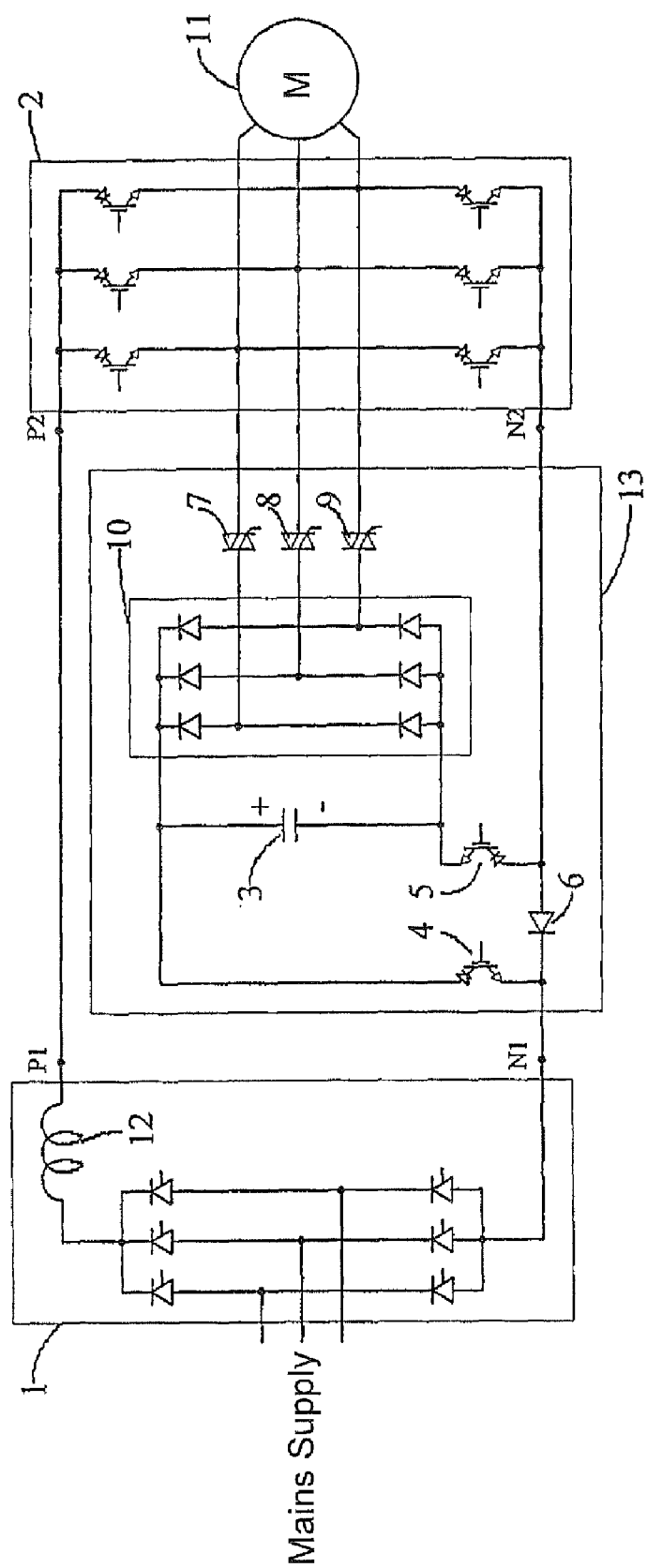
FIG. 2: Exemplary embodiment of a circuit arrangement implementing the invention.

FIG. 2 shows a typical circuit for implementing the method described in claim 1.

The depicted RIGBT components, 4 and 5 symbolize a reverse blocking component that is switchable on and off by the gate electrode. According to the state of the art, this component is either
 a reverse blocking IGBT (RIGBT) or
 an IGBT with a series connected diode, or
 a GTO thyristor.

Structure of the Circuit According to FIG. 2:

Current Source 1 and Inverter 2:

Current source 1 is formed by a line-commutated rectifier connected to the AC network together with intermediate circuit inductor 12. Positive power source terminal P1 is connected to positive inverter terminal P2, and three-phase motor 11 is connected to the outputs on the motor side of inverter 2. The inverter 2 comprises no commutation capacitors.

Commutation Unit 13:

The three motor side outputs of inverter 2 are connected to the three middle connections of diode bridge 10 by respective triac components 7, 8, 9.

The common cathode of the three upper diodes of diode bridge 10 is connected to the positive terminal of the commutation capacitor 3, the common anode of the three lower diodes of diode bridge 10 is connected to the negative terminal of the commutation capacitor 3. The positive terminal of the commutation capacitor 3 is connected to the collector of the first RIGBT 4, its negative terminal is connected to the emitter of the second RIGBT 5, the emitter of the first RIGBT 4 is connected to the cathode of diode 6, and the collector of the second RIGBT 5 is connected to the anode of diode 6; diode 6 is connected in series with the negative conductor line, the cathode is connected to the negative current source terminal N1 and the anode is connected to the negative inverter terminal N2.

Operation of the Circuit According to FIG. 2:

FIGS. 4a to 4e show the different phases of a complete inverter commutation.

Figure 4A:
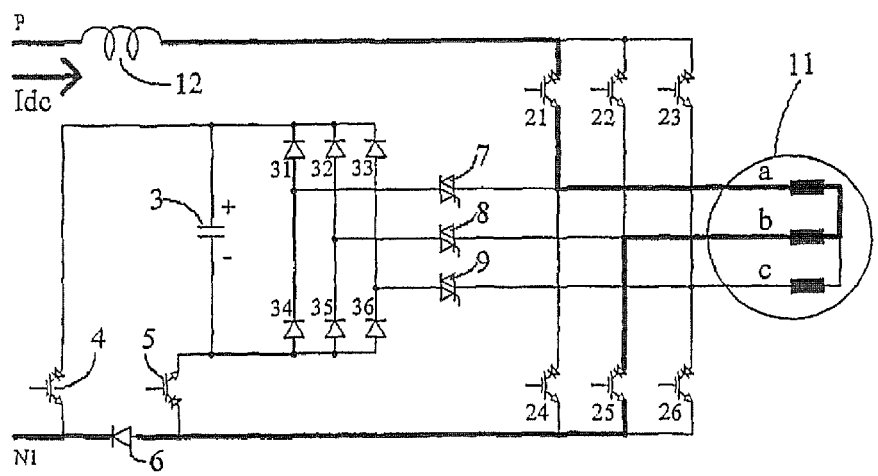
FIG. 4: Explanatory drawings of the exemplary embodiment according to FIG. 2.

FIG. 4a shows the conditions prior to the commutation. The current is flowing through motor phases a and b.

The inverter commutation is initiated by the simultaneous switch-on of RIGBT 26, switch-off of RIGBT 25, ignition of triac 8 and triac 9.

Figure 4B:
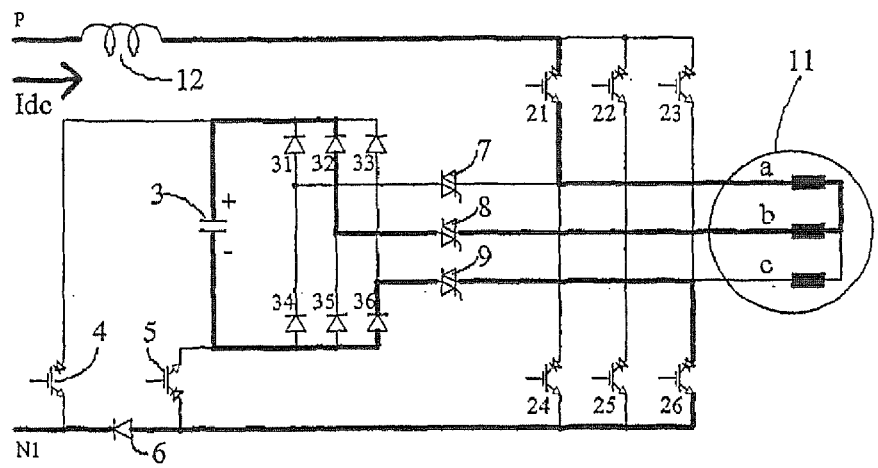

According to FIG. 4b, the current is now flowing through commutation capacitor 3, which stores the commutation energy.

Figure 4C:
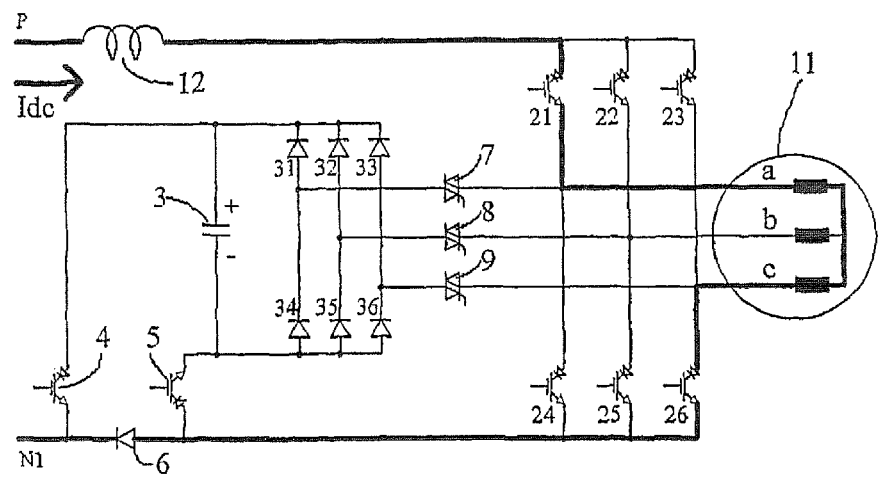

The current in motor phase b is decreasing and the current in motor phase c is increasing. Commutation capacitor 3 is being charged. The process is terminated by diodes 32 and 36 as well as triac 8 and triac 9 as soon as the current in motor phase b reaches zero. The commutation energy is now stored in commutation capacitor 3 (FIG. 4c).

Figure 4D:
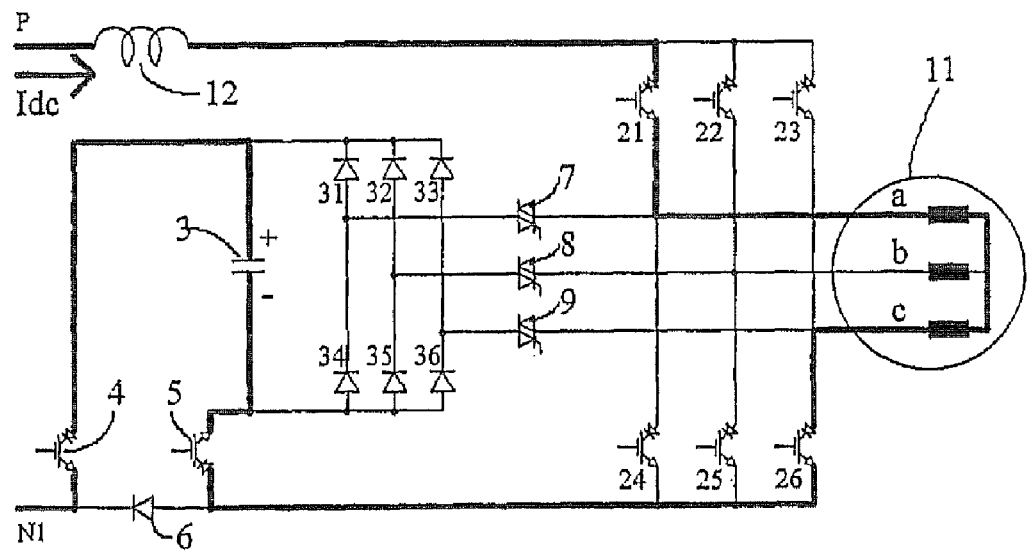

RIGBT 4 and RIGBT 5 are simultaneously switched on. The intermediate circuit current is flowing through commutation capacitor 3 and is discharging it. The intermediate circuit inductor 12 is taking up the communication energy (FIG. 4d).

When the voltage of commutation capacitor 3 reaches its initial value, RIGBT 4 and RIGBT 5 are simultaneously switched off.

Figure 4E:
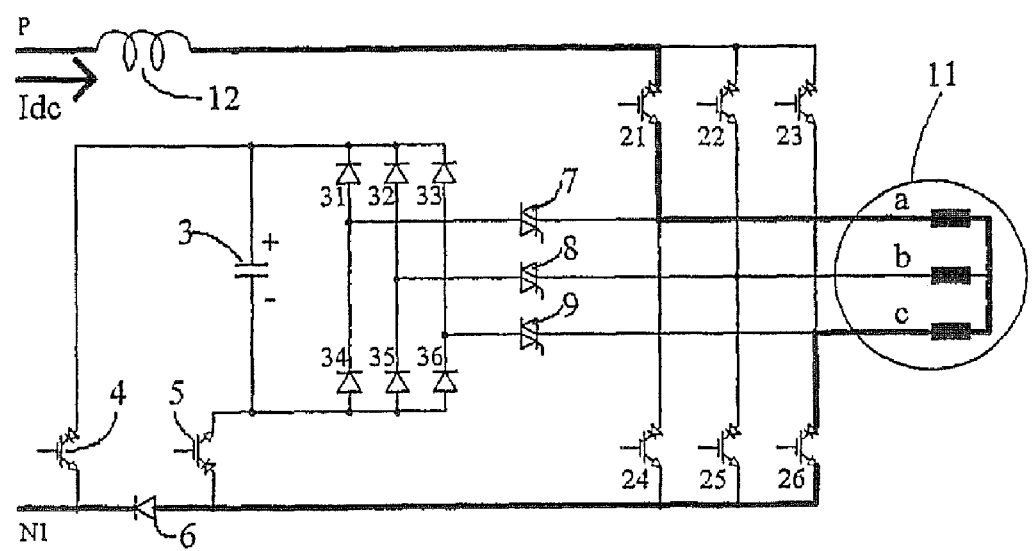

The commutation process between motor phases b and c is completed, the circuit is ready for the following commutation (FIG. 4e).

Figure 3:
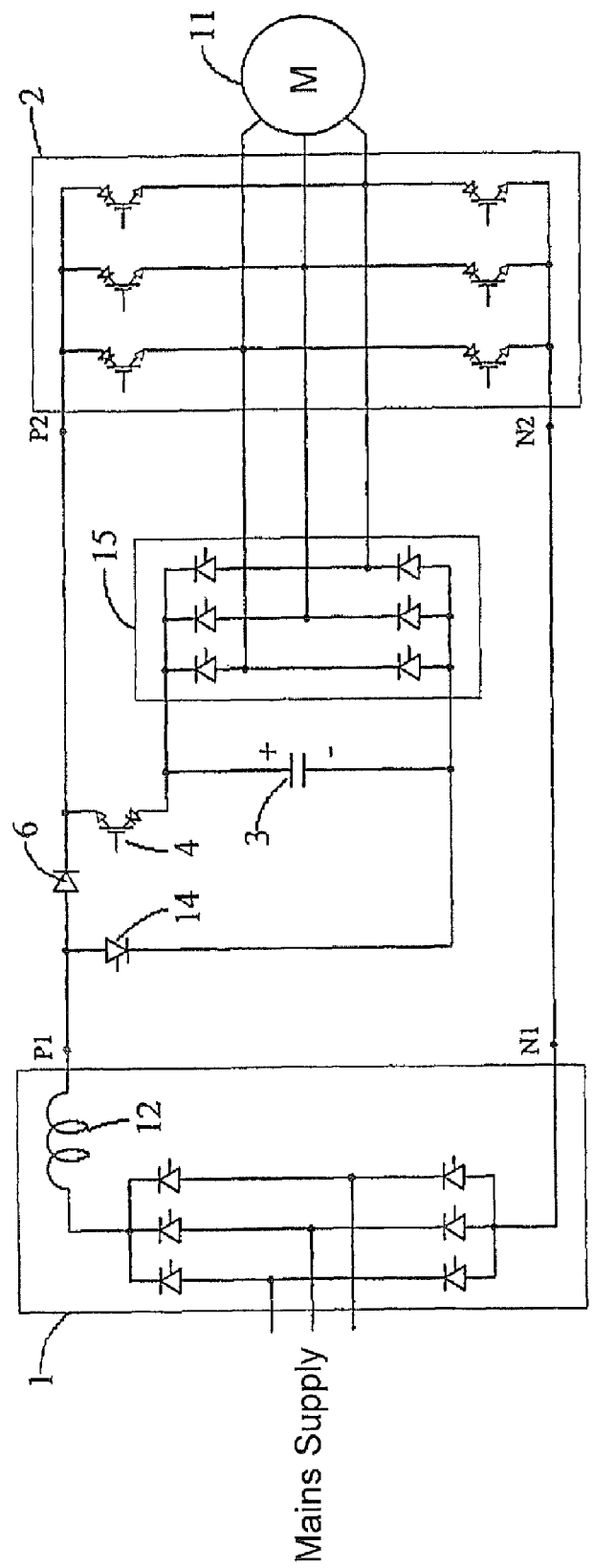
FIG. 3: Another exemplary embodiment.

FIG. 3 shows another exemplary embodiment for implementing the method described in claim 1.

In this circuit, instead of an RIGBT, thyristor 14 is used. Thyristor bridge 15 fulfills the function of the three triacs 7, 8, 9 and of diode bridge 10.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. A method for the feedback of the commutation energy in a three-phase current drive system including a current intermediate circuit converter, said current intermediate circuit converter comprises a current source, an inverter, and a commutation unit, the method comprises the following steps:
   in a first step, during a first inverter commutation, the created commutation energy is stored in a commutation capacitor, and
   in a second step, after the end of the first inverter commutation and before the beginning of the following inverter commutation, the commutation energy is directly fed from the commutation capacitor to the current intermediate circuit by means of two controllable semiconductors and a diode connected in series in the current intermediate circuit so that the intermediate circuit current only flows through the commutation capacitor for a controlled time.

2. The method according to claim 1, wherein in the first step the created commutation energy is stored in a commutation capacitor by a rectifier circuit that is partly or entirely built up of controllable semiconductors and connected to the three motor side inverter outputs.

3. The method according to claim 1, wherein the respective controllable semiconductor is an RIGBT, an IGBT with a series connected diode, or a thyristor.

4. A circuit arrangement for the feedback of the commutation energy in a three-phase current drive system, including a current intermediate circuit converter comprising a current source, an inverter, and a commutation unit, the circuit arrangement further comprises:
   a commutation capacitor for storing the commutation energy created during an inverter commutation, and,
   for feeding the stored commutation energy into the current intermediate circuit, two controllable semiconductors and a diode connected in series in the current intermediate circuit.

5. The circuit arrangement according to claim 4, wherein the respective controllable semiconductor is an RIGBT, an IGBT with a series connected diode, or a thyristor.

6. The circuit arrangement according to claim 4, further comprising a diode, wherein the two controllable semiconductors are a first RIGBT and a second RIGBT, the positive terminal of the commutation capacitor is connected to the collector of the first RIGBT, the negative terminal of the commutation capacitor is connected to the emitter of the second RIGBT, the emitter of the first RIGBT is connected to the cathode of the diode, the collector of the second RIGBT is connected to the anode of the diode, and wherein the diode is connected in series in the negative conductor line so that the cathode of the diode is connected to the negative terminal of the current source and the anode of the diode is connected to the negative terminal of the inverter.

7. The circuit arrangement according to claim 4, further comprising a diode which is connected in series in the positive conductor line so that the anode of the diode is connected to the positive terminal of the current source and the cathode of the diode is connected to the positive terminal of the inverter.

8. The circuit arrangement according to claim 4, further comprising a rectifier circuit that is connected to the three motor side inverter outputs.

9. The circuit arrangement according to claim 8, wherein the rectifier circuit is partly or entirely built up of controllable semiconductors.

10. The circuit arrangement according to claim 8, wherein the rectifier circuit comprises a three-phase diode bridge, the common cathode of the three upper diodes of the diode bridge being connected to the positive terminal of the commutation capacitor, the common anode of the three lower diodes of the diode bridge being connected to the negative terminal of the commutation capacitor, and the three middle connections of the diode bridge being connected to the three motor side inverter outputs by respective triacs.

11. The circuit arrangement according to claim 8, wherein the rectifier circuit is a three-phase thyristor bridge including six thyristors, the common cathode of the three upper thyristors being connected to the positive terminal of the commutation capacitor, the common anode of the three lower thyristors being connected to the negative terminal of the commutation capacitor, and the three middle connections of the thyristor bridge being connected to the three motor side inverter outputs.

* * * * *